Figure 1:
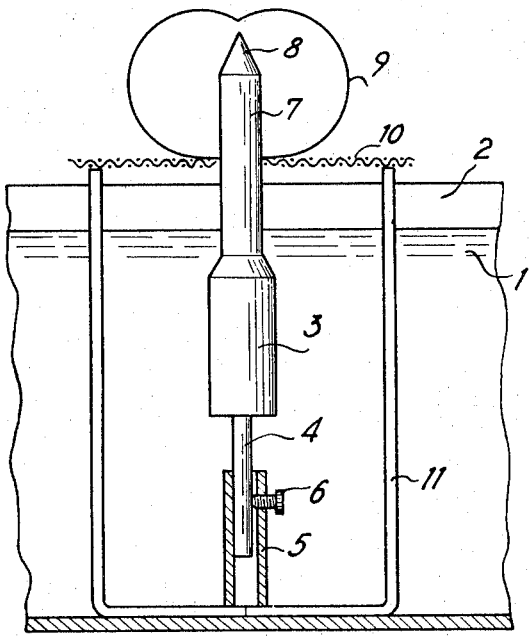

Jan. 3, 1967 G. SAVARD ET AL 3,295,220

METHOD FOR FREEZING FOODSTUFFS AND BIOLOGICAL PRODUCTS

Filed July 12, 1965

3,295,220
METHOD FOR FREEZING FOODSTUFFS AND
BIOLOGICAL PRODUCTS
Guy Savard, Westmound, Quebec, and Robert Lee, Montreal, Quebec, Canada, assignors to L'Air Liquide, Societe Anonyme pour l'Etude et l'Exploitation des Procedes Georges Claude
Filed July 12, 1965, Ser. No. 471,253
Claims priority, application France, July 21, 1964, 982,464, Patent 1,409,847
10 Claims. (Cl. 34—5)

This invention relates to the freezing of foodstuffs, or biological products, and more particularly to a method for freezing comparatively large, coherents units of foodstuffs by indirect heat exchange with a low-temperature liquid. The invention also relates to the products obtained by the said method and to an apparatus for freezing such foodstuffs and biological products.

The use of cryogenic liquids has already been suggested as a method for freezing foodstuffs. However, freezing through direct contact of the foodstuff with a cryogenic liquid, such as liquid nitrogen, may produce cracks in the foodstuff, which preclude the use of this method.

According to this invention, it has been found that the freezing of foodstuffs, e.g. fruit or vegetables, can be achieved through indirect contact with liquids at low temperature according to a method to be disclosed hereafter.

It has been found that units of foodstuffs freeze rapidly, with little or no superficial deterioration, when the inside of the material to be frozen is brought into indirect contact with a cryogenic liquid, e.g. liquid nitrogen.

The method of the invention comprises introducing into the inner part of said foodstuff unit the upper part of a metallic elongated member, then immersing in a bath of said liquid the lower part of said metallic elongated member.

The method involves also the following preferred embodiments, taken either separately or in combination:

(a) The foodstuff unit is a fruit or a vegetable, in the innermost portion of which one extremity of a metal arbor is introduced, the other extremity of which is immersed into a bath of liquefied gas;

(b) The foodstuff unit is kept apart from the bath of liquefied gas by a spacing device;

(c) The metal arbor has a generally cylindrical shape, and is introduced into the innermost portion of the fruit or vegetable parallel to its axis;

(d) The extremity of the metal arbor which is to be introduced into the fruit has a conical shape;

(e) The portion of the metal arbor which is to be immersed into the bath of liquefied gas has a larger diameter than the portion which is to be introduced into the fruit;

(f) The portion of the metal arbor which is to be immersed into the bath of liquefied gas is provided with auxiliary heat-exchange surfaces, such as fins;

(g) Before the metal arbor is introduced into the foodstuff unit, a volume approximately equal to the volume to be occupied by the metal arbor is removed from the said foodstuff unit.

It has been found that indirect freezing as defined above was faster or at least as fast as freezing through direct immersion into the cryogenic fluid, without having the disadvantages inherent to freezing through direct immersion.

The invention is disclosed in greater detail hereafter with reference to the appended drawing.

Figure 2:
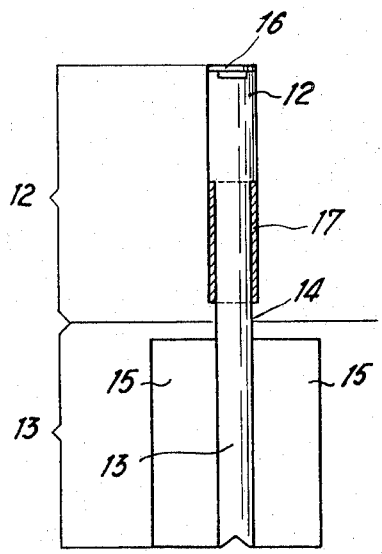

In the latter, FIG. 1 shows a side view of an apparatus for freezing tomatoes according to this invention; FIG. 2 shows a side elevation of a variation of the apparatus shown on FIG. 1.

In the apparatus shown on FIG. 1 liquid nitrogen 1 is contained in a suitable vessel 2. A copper cylindrical arbor 3 is continued by a regulating rod 4 adjustably linked to the arbor by a holder 5 and a clamping screw 6 at the center of the bottom of a tripod stand 11 partly immersed in the liquid nitrogen. A perforated screen 10 rests on the upper arms of the stand. The amount of liquid nitrogen in the vessel is regulated so as to fill the major portion of the latter, while leaving a free space between the surface of the liquid nitrogen and the perforated screen. The lower portion of the copper arbor 3, the diameter of which is larger than the diameter of the upper portion, is immersed in the liquid nitrogen. The upper portion 7 of the copper arbor is partly or wholly above the surface of the liquid nitrogen, and goes through the perforated screen 10. The top 8 of the upper portion of the copper arbor has a conical shape, so as to facilitate its introduction into the tomato 9. A central portion of the tomato 9 has previously been removed, the amount removed having approximately the same size as the portion of the arbor to be introduced into the tomato. However, in cases when the skin of the product is sufficiently flexible, as for oranges, or when the size of the product is small, as for grapes, no hollowing out of the product is required.

The lower surface of the tomato rests on the perforated screen 10. The free space between the perforated screen 10 and the surface of the bath of liquid nitrogen is so determined that the bath of liquid nitrogen does not produce direct freezing of the lower surface of the tomato.

In the embodiment shown, the copper arbor 3 has a cylindrical shape. However, other shapes are also suitable, as will be readily understood by all those skilled in the art.

Although liquid nitrogen is the preferred cryogenic fluid, as being the most easily procurable, other cryogenic fluids, such as the Freons, carbon dioxide, helium, neon, nitrous oxide, may also be used.

The method of the invention may notably be applied to fruit and vegetables as picked. In that case, it is well known that they can be treated chemically to obtain a firmer structure through the conversion of fruit pectin. The method of the invention may optionally involve such treatment of the fruit or vegetable prior to freezing.

Freezing and desiccating methods are also known in which the water in the foodstuff is eliminated. Such methods allow faster freezing of the product, thus avoiding the problems of lengthy freezing, loss of time, loss of firmness, etc.

In another embodiment of the invention, foodstuffs are frozen as described, then subjected to low-temperature desiccation to eliminate part at least of the water in the product before storage.

Although arbor 3 was described above as being made of copper, other metals are also suitable, e.g. steel, provided their heat transmission coefficient is high enough to allow freezing of foodstuffs within reasonable time. Moreover, it will be readily understood by those skilled in the art that the shape of the arbor may be altered, the only conditions to be observed being that its size and thermal conductibility be such that the fruit be rapidly frozen. However, the freezing operation should not be too fast, which might cause the fruit to burst. Moreover, the upper portion of the arbor should be so shaped as to allow easy introduction into the fruit.

FIG. 2 shows a different shape of arbor, as well as a different combination of metallic materials.

The cylindrical arbor 14 includes an upper portion 12 which is to be introduced into the fruit to be frozen, and a lower portion 13 to be completely immersed into a cryogenic liquid in a suitable manner, e.g., with the arrangement described in connection with FIG. 1.

The lower portion 13 of arbor 14 is provided with copper fins 15 welded on the cylindrical arbor. The upper portion 12 is provided at the top with a steel disk 16 also welded to the cylindrical arbor. The upper portion 12 is also surrounded with a steel sleeve 17 on a major portion of its height.

Such an arrangement is particularly advantageous for the treatment of fruit with a roughly spherical shape. By using metals with different conductivities, e.g., steel for disk 16 and sleeve 17 and copper for the portion of the arbor 12 between the disk and the sleeve, the extremities of the vertical axis of the fruit freeze more slowly, which avoids the cracks due to excessively fast freezing, while preserving a normal rate of freezing for the portions of the fruit farthest from the vertical axis.

It will be readily understood that the duration of the treatment depends on various factors, among which the shape of the product and its temperature before treatment, the size and shape of the arbor, the temperature of the cryogenic fluid, and the distance between the product and the fluid.

The following descriptions of fruit-freezing operations according to the invention are given for illustrative purposes only, and are not intended to limit the scope of the invention.

EXAMPLE 1

A whole orange is placed upon an arbor identical to the one described in connection with FIG. 1. The conical point of the arbor is 12.5 mm. in length. The upper portion 7 of the arbor is 82.5 mm. in length and 16 mm. in diameter, while the lower portion, which is immersed in liquid nitrogen, is 76 mm. in length and 25 mm. in diameter. The orange is entirely frozen, without cracks, in 7 to 11 minutes. To compare with prior art arrangements, a similar orange is directly immersed into a vessel containing liquid nitrogen. The latter orange shows numerous external cracks after 4 minutes' contact.

EXAMPLE 2

A grapefruit weighing approximately 470 g. and 91 mm. in diameter is frozen in the same way as in Example 1. The grapefruit is entirely frozen in approximately 12 minutes. No deterioration of the surface of the grapefruit is visible immediately after it has been withdrawn from the arbor.

EXAMPLE 3

A whole tomato is frozen within 7 minutes in the same way as in Example 1. After defreezing, the texture of the fruit is compared with that of a fresh tomato: the texture and taste are surprisingly similar.

The principle of the invention may also be applied to other fruit, to vegetables, fish, fresh meat, cooked meat, or cooked foodstuffs generally. The freezing apparatus may be altered in various ways, which will be apparent to those skilled in the art.

The method of the invention also applies to the freezing of biological products for preservation.

The invention also includes the arbor for heat transmission and the refrigerating devices as described above.

What we claim is:

1. A method for freezing relatively large, coherent units of foodstuffs and biological products, by indirect heat exchange with a cryogenic liquid at low temperature, said products being provided with at least an axis characterized by the steps of introducing the upper part of a metallic elongated member into each unit, and of immersing the lower part of said metallic elongated member into the liquid at low temperature and withdrawing from the inner zone of each of the units a volume approximately equal to the volume to be occupied by the upper part of the metallic elongated member before the metallic elongated member is introduced into said unit.

2. A method according to claim 1, wherein the cryogenic liquid at low temperature is a liquefied gas.

3. A method according to claim 1, wherein the metallic elongated member is an arbor of a generally cylindrical shape.

4. A method according to claim 3, wherein the upper part of the arbor is introduced into the innermost part of the unit of foodstuff parallel to its axis.

5. A method according to claim 1, wherein the upper part of the metallic elongated member is of a conical shape.

6. A method according to claim 1, wherein the lower part of the metallic elongated member has a larger transverse size than its upper part.

7. A method according to claim 1, wherein the lower part of the metallic elongated member is provided with auxiliary heat exchange surfaces.

8. A method according to claim 1, wherein the relatively large, coherent units of foodstuff are fruits or vegetables.

9. A method according to claim 1, wherein the products are subjected to low temperature desiccation to eliminate a portion of the water in the product, and then storing the products.

10. A device for the refrigeration of a relatively large, coherent unit of foodstuff or biological product comprising means for holding a bath of cryogenic liquid, a stand immersed in said bath and the upper part of which extends above the level of said bath, a grid supported on said upper part of said stand and provided with a hole extending through the grid, one metallic cylinder having at one end means for facilitating its penetration into the innermost part of said unit and having at its other end auxiliary heat exchange surfaces, and means for holding said one end of said metallic cylinder protruding above said grid through said hold thereof sufficiently high enough to allow it to penetrate into the innermost part of said unit, said auxiliary heat exchange surfaces being positioned within said bath.

References Cited by the Examiner

UNITED STATES PATENTS

| 1,939,334 | 12/1933 | Burke | 62—341 |
| 1,970,956 | 8/1934 | Elser | 62—62 X |
| 2,997,858 | 8/1961 | Perez | 62—293 |
| 3,048,989 | 8/1962 | Morrison | 62—64 X |

ROBERT A. O'LEARY, *Primary Examiner.*

W. E. WAYNER, *Assistant Examiner.*